US012182543B2

United States Patent
Thiebaut-George et al.

(10) Patent No.: US 12,182,543 B2
(45) Date of Patent: Dec. 31, 2024

(54) RULE BUILDER AND SIMULATOR TOOL FOR CREATING COMPLEX EVENT PROCESSING RULES

(71) Applicant: Tyco Fire & Security GmbH, Neuhausen am Rheinfall (CH)

(72) Inventors: Eric Thiebaut-George, Cork (IE); Nicolae Bogdan Pavel, County Cork (IE)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 17/364,638

(22) Filed: Jun. 30, 2021

(65) Prior Publication Data

US 2022/0004369 A1 Jan. 6, 2022

Related U.S. Application Data

(60) Provisional application No. 63/046,894, filed on Jul. 1, 2020.

(51) Int. Cl.
*G06F 8/34* (2018.01)
*G06F 11/34* (2006.01)
(52) U.S. Cl.
CPC ............ *G06F 8/34* (2013.01); *G06F 11/3457* (2013.01)
(58) Field of Classification Search
CPC ............................... G06F 8/34; G06F 11/3457
See application file for complete search history.

(56) References Cited

U.S. PATENT DOCUMENTS

| 7,926,063 | B2 * | 4/2011 | Afshar | G06F 16/40 |
| | | | | 719/310 |
| 8,683,431 | B2 * | 3/2014 | Thomson | G06Q 10/06 |
| | | | | 717/113 |
| 10,976,068 | B2 | 4/2021 | Hallendy et al. | |
| 2009/0106701 | A1 * | 4/2009 | Yalamanchi | G06F 16/26 |
| | | | | 715/841 |
| 2009/0210364 | A1 * | 8/2009 | Adi | G06N 5/025 |
| | | | | 706/59 |

(Continued)

OTHER PUBLICATIONS

Pythagoras Karampiperis et al., "ER designer toolkit: a graphical event definition authoring tool," 2011 [retrieved on Dec. 6, 2022], PETRA '11: Proceedings of the 4th International Conference on PErvasive Technologies Related to Assistive Environments, pp. 1-5, downloaded from <url>:https://dl.acm.org. (Year: 2011).*

(Continued)

*Primary Examiner* — S. Sough
*Assistant Examiner* — Stephen D Berman
(74) *Attorney, Agent, or Firm* — Foley & Lardner LLP

(57) ABSTRACT

A method for implementing rules in a complex event processing (CEP) engine is shown. The method includes displaying an interactive diagramming tool to a user on a user interface. The method includes receiving, via the interactive diagramming tool, one or more commands to create a rule. The method includes generating the rule for a complex event processing (CEP) engine based on the received commands. The method includes performing a validation process of the rule and, in response to completion of the validation process, integrating the rule into the CEP engine.

17 Claims, 11 Drawing Sheets

(56) References Cited

U.S. PATENT DOCUMENTS

| | | | | |
|---|---|---|---|---|
| 2011/0295616 | A1* | 12/2011 | Vesto | G06Q 10/06 |
| | | | | 705/2 |
| 2013/0238795 | A1* | 9/2013 | Geffin | G06F 1/3203 |
| | | | | 709/224 |
| 2016/0085399 | A1* | 3/2016 | Jain | G06F 8/34 |
| | | | | 715/738 |
| 2016/0154692 | A1* | 6/2016 | Heinz | G06F 11/0772 |
| | | | | 714/2 |
| 2017/0236067 | A1* | 8/2017 | Tjiong | G05B 23/0229 |
| | | | | 706/11 |
| 2017/0277560 | A1* | 9/2017 | Lucas | G06F 8/31 |

OTHER PUBLICATIONS

Assaf Marron, "A decentralized approach for programming interactive applications with JavaScript and blockly," 2012 [retrieved on Mar. 8, 2024], AGERE! 2012, pp. 59-70, downloaded from <url>:https://dl.acm.org. (Year: 2012).*

Peter Kronberger, "A Tool to Support Mining of Constraints for Monitoring Systems of Systems," 2018 [retrieved on Mar. 8, 2024], pp. 1-65, downloaded from <url>:https://epub.jku.at/obvulihs/content/titleinfo/2667413/full.pdf. (Year: 2018).*

Alessandro Margara et al., "Learning from the past: automated rule generation for complex event processing," 2014 [retrieved on Aug. 10, 2024], DEBS '14: Proceedings of the 8th ACM International Conference on Distributed Event-Based Systems, pp. 47-58, downloaded from <url>:https://dl.acm.org. (Year: 2014).*

* cited by examiner

RULE BUILDER AND SIMULATOR TOOL FOR CREATING COMPLEX EVENT PROCESSING RULES

CROSS-REFERENCE TO RELATED APPLICATION

This application claims priority from U.S. Provisional Patent Application No. 63/046,894, filed Jul. 1, 2020, which is incorporated by reference herein in its entirety.

BACKGROUND

The present disclosure relates generally to processing event data. More particularly, the present disclosure relates to use of a visual programming tool for the creation and testing of complex event processing rules.

Computer-based systems that monitor environments such as buildings, ships, aviation and other transport networks, and electricity networks, receive a variety of inputs from sensors and human operators. Each environment may have a variety of subsystems with both shared and unique inputs. For example, the subsystems within a building may include security, fire, environmental control, and lighting. Example inputs may include contact sensors on doors, smoke detectors, thermometers, and light switches. A system, subsystem, or specialized device may infer from changes in its input that there has been a significant incident. For example, sensor input from a contact sensor on a door may be evaluated to determine that a door has been forced open. When a significant incident is identified, a corresponding data package describing the incident may be generated. The data package is described henceforth as an event, and may describe information such as the time of the incident, the location of the incident, and an evaluation of its significance. Information relating to individual events from multiple sources may be combined into an event stream.

An event stream may be communicated to an event processing system, which may use a specialized form of stream processing called complex event processing (CEP) to process the events in real-time as they arrive at the system. As an alternative to processing events individually as they arrive, an event processing system may buffer events in a queue, and then process them in batches. In either case, CEP rules may be defined that determine how the events are processed and what the resulting actions should be.

CEP rules can be created that identify trends and patterns in an event stream. For example, an event stream may contain events generated by a fire system, and a CEP rule may be created so that detection of smoke by a first detector accompanied by the detection of smoke by a second detector that is near to the first detector, triggers an immediate evacuation alarm in respect of a building.

In the existing art, example methods of defining CEP rules include using Java objects and a syntax similar to Structured Query Language (SQL) to create rules. These methods require specialized understanding of the structure and syntax that is used. The complexity of the rule structures and the method of their creation, which is predominantly by text entry, increases the probability that mistakes will be made. Evaluation or modification by a person not directly involved in the creation of a CEP rule is also difficult due to the complexity of their structure. No user-friendly interface exists that can be used to configure complex CEP rules, and can also interconnect with other parts of the system.

Some CEP rules may be broadly applicable to a particular domain, such as security, and may be predefined in a software application for that domain. However, organizations and building premises have unique needs and characteristics that require predefined CEP rules to be modified and new, bespoke CEP rules to be created. It is advantageous for security monitors, building managers, and similar actors to have a more straightforward way of creating, updating, testing, and implementing CEP rules.

SUMMARY

One implementation of the present disclosure is a method for implementing rules in a complex event processing (CEP) engine. The method includes displaying an interactive diagramming tool to a user on a user interface. The method further includes receiving, via the interactive diagramming tool, one or more commands to create a rule. The method further includes generating the rule for the CEP engine based on the received commands. The method further includes performing a validation process of the rule. The method further includes, in response to completion of the validation process, integrating the rule into the CEP engine.

In some embodiments, displaying the interactive diagramming tool includes displaying a region and a plurality of blocks, the region configured to facilitate connections of the plurality of blocks to create the rule.

In some embodiments, receiving the one or more commands to create the rule includes receiving an indication that two or more of the plurality of blocks have been connected in the region, the two or more blocks representing at least one of an event filter, a constraint, or an action.

In some embodiments, receiving the one or more commands to create the rule includes defining one or more attributes of a CEP rule as exposed attributes, selecting locations for the exposed attributes within a block of text, and displaying the block of text in a user interface. In some embodiments, the value of the exposed attributes are displayed at the selected locations in the block of text.

In some embodiments, generating the rule for the CEP engine includes determining one or more attributes associated with the rule and replacing, with the one or more attributes, one or more original attributes implemented in the CEP engine.

In some embodiments, performing the validation process of the rule includes receiving a command to select one or more data sources for a plurality of events, wherein the plurality of events have associated time stamps, evaluating a simulation of the plurality of events against the rule in sequential order of the associated time stamp, and displaying an output based on the simulation to the user interface.

In some embodiments, performing the validation process of the rule includes establishing a data connection with an external system over a computer network, transferring an encoding of the rule to a first data store in the external system, processing the encoding by the external system to determine a second encoding that is compatible with a processing system in the external system, transferring the second encoding to a second data store on the external system, and evaluating the second encoding by a processing on the external system.

Another implementation of the present disclosure is a controller in an event processing system, the controller including a processing circuit configured to display an interactive diagramming tool to a user on a user interface. The processing circuit is further configured to receive, via the interactive diagramming tool, one or more commands to create a rule, generate the rule for a complex event processing (CEP) engine based on the received commands, perform a validation process of the rule, and, in response to completion of the validation process, integrate the rule into the CEP engine.

In some embodiments, displaying the interactive diagramming tool includes displaying a region and a plurality of blocks, the region configured to facilitate connections of the plurality of blocks to create the rule.

In some embodiments, receiving the one or more commands to create the rule includes receiving an indication that two or more of the plurality of blocks have been connected in the region, the two or more blocks representing at least one of an event filter, a constraint, or an action.

In some embodiments, receiving the one or more commands to create the rule includes defining one or more attributes of a CEP rule as exposed attributes, selecting locations for the exposed attributes within a block of text, and displaying the block of text in a user interface. In some embodiments, wherein the value of the exposed attributes are displayed at the selected locations in the block of text.

In some embodiments, generating the rule for the CEP engine includes determining one or more attributes associated with the rule and replacing, with the one or more attributes, one or more original attributes implemented in the CEP engine.

In some embodiments, performing the validation process of the rule includes receiving a command to select one or more data sources for a plurality of events, wherein the plurality of events have associated time stamps, evaluating a simulation of the plurality of events against the rule in sequential order of the associated time stamp for each event of the plurality of events, and displaying an output based on the simulation to the user interface.

In some embodiments, performing the validation process of the rule includes establishing a data connection with an external system over a computer network, transferring an encoding of the rule to a first data store in the external system, processing the encoding by the external system to determine a second encoding that is compatible with a processing system in the external system, transferring the second encoding to a second data store on the external system, and evaluating the second encoding by a processing on the external system.

In some embodiments, generating the rule includes analyzing an attribute of a component that is bound to a parameter in the event processing system, such that a value or a range of values of the attribute from which the user can assign to the attribute is determined by the parameter in the event processing system.

In some embodiments, the value or the range of values of the attribute can be modified and, in response to modifying the value or range of values, updating one or more corresponding attributes in the CEP rule to match the modified value or range of values.

Another implementation of the present disclosure is one or more computer-readable media for implementing rules in a complex event processing (CEP) engine. The computer-readable media has instructions stored thereon that, when executed by one or more processors, causes the one or more processors to perform operations. The operations include displaying an interactive diagramming tool to a user on a user interface, receiving, via the interactive diagramming tool, one or more commands to create a rule, generating the rule for a CEP engine based on the received commands, performing a validation process of the rule, and, in response to completion of the validation process, integrating the rule into the CEP engine.

In some embodiments, displaying the interactive diagramming tool includes displaying a region and a plurality of blocks, the region configured to facilitate connections of the plurality of blocks to create the rule.

In some embodiments, receiving the one or more commands to create the rule includes receiving an indication that two or more of the plurality of blocks have been connected in the region, the two or more blocks representing at least one of an event filter, a constraint, or an action.

In some embodiments, receiving the one or more commands to create the rule includes defining one or more attributes of a CEP rule as exposed attributes, selecting locations for the exposed attributes within a block of text, displaying the block of text in a user interface. In some embodiments, the value of the exposed attributes are displayed at the selected locations in the block of text.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to THE FIGURES, systems and methods for implementing rules within a complex processing engine (CEP) are shown, according to some embodiments. A CEP rule engine can be implemented in an event processing system that takes in as inputs an event stream, analyzes the event stream based on a set of rules to determine one or more actions to take, and provides these actions to a standard operation procedure (SOP) system. In some embodiments, the event streams include data sets from multiple different devices and/or subsystems within a building management system (BMS), such as fire detection and suppression subsystems, access control subsystems, heating, ventilation, or air conditioning (HVAC) subsystems, lighting subsystems, and power monitoring subsystems.

In some embodiments, a CEP rule builder is established that allows users to adjust the configuration settings (e.g., change the rules for the CEP rule engine, etc.) in the event processing system. This may be performed using a rule builder user interface that allows the user to, via a diagramming tool on the user interface, generate the structure of a new rule using visual tools (e.g., blocks, drop down boxes, etc.). The system can process the visual representation of the rule, and provide it to the CEP rule engine to be implemented. In some embodiments, the CEP rules currently implemented in the event processing system and/or those created by users can be created for any number of reasons, such as to facilitate specific types of events, to prevent unwanted events, to detect anomalous patterns, and to detect system faults.

Building Security System

Figure 1:
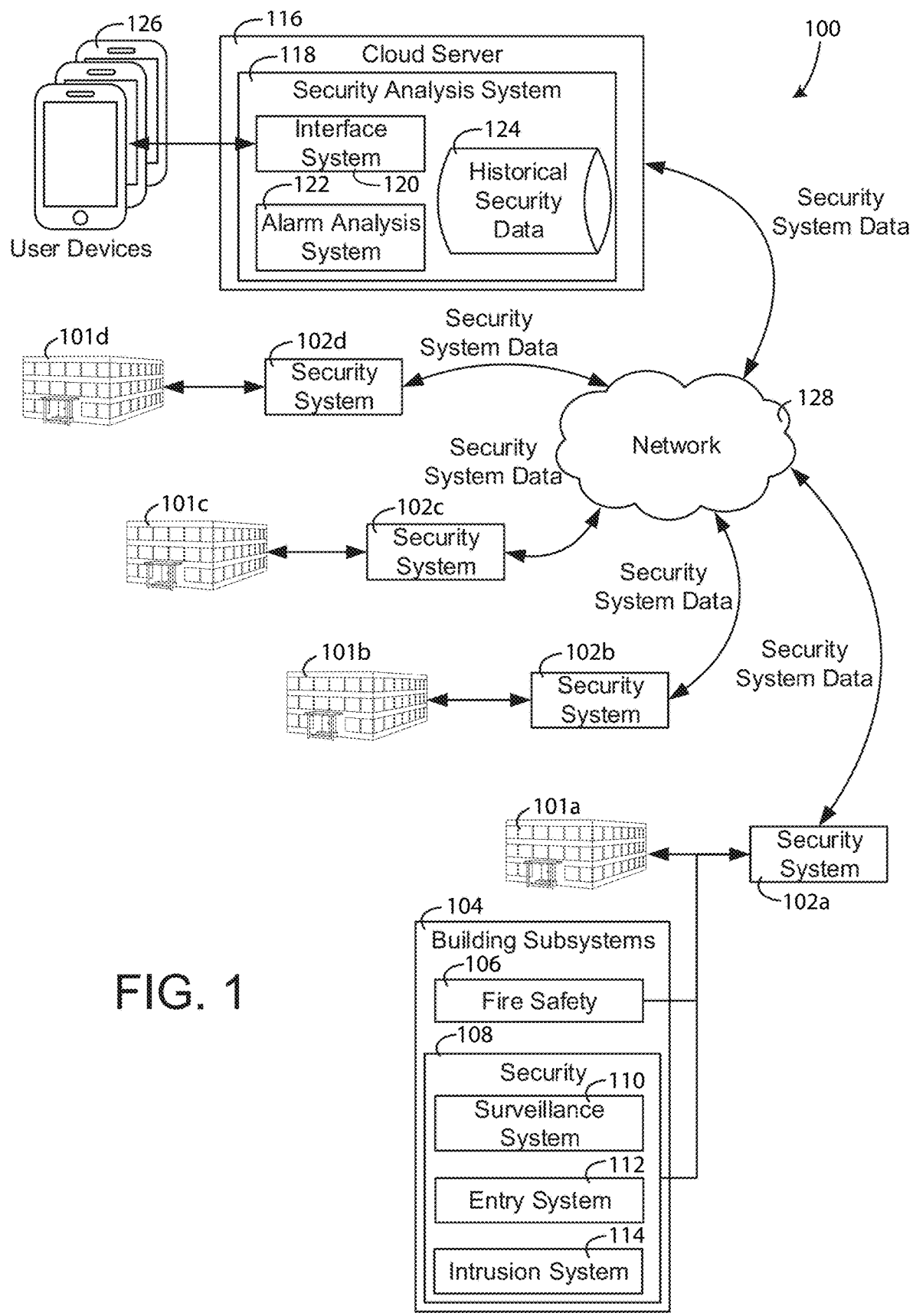
FIG. 1 is a block diagram of building security systems for multiple buildings communicating with a cloud based security system, according to some embodiments.

Referring now to FIG. 1, a security system 100 is shown for multiple buildings, according to an exemplary embodiment. The security system 100 is shown to include buildings 101a-101d. The security systems 102a-102d may record data from the building subsystems 104 and communicate collected security system data to the cloud server 116 via network 128.

The security systems 102a-102d may communicate with, or include, various security sensors and/or actuators, and building subsystems 104. For example, fire safety subsystems 106 may include various smoke sensors and alarm devices, carbon monoxide sensors, alarm devices, etc. Security subsystems 108 are shown to include a surveillance system 110, an entry system 112, and an intrusion system 114. The surveillance system 110 may include various video cameras and still image cameras for monitoring various rooms, hallways, parking lots, the exterior of a building, the roof of the building, etc. The images captured by the surveillance system may be viewed by human observers. An observer may also have access to an interface for a computerized system through which they can raise an alarm or input some other type of event. The images captured by the surveillance system may also be fed into a computerized system for automated processing. This automated processing may use techniques such as machine learning and image recognition to automatically detect security risks or other events. The entry system 112 can include one or more systems configured to allow users to enter and exit the building (e.g., door sensors, turnstiles, gated entries, badge systems, etc.) The intrusion system 114 may include one or more sensors configured to identify whether a window or door has been forced open. The intrusion system 114 can include a keypad module for arming and/or disarming a security system and various motion sensors (e.g., IR, PIR, etc.) configured to detect motion in various zones of the building 100a. The security systems 102a-102d and building subsystems 104 may generate events based on the recorded sensor data.

The cloud server 116 is shown to include a security analysis system 118 that receives the security system data from the security systems 102a-102d of the buildings 100a-100d. In some embodiments, the cloud server 116 can be located on premises within one of the buildings 100a-100d.

Complex Event Processing

Figure 2:
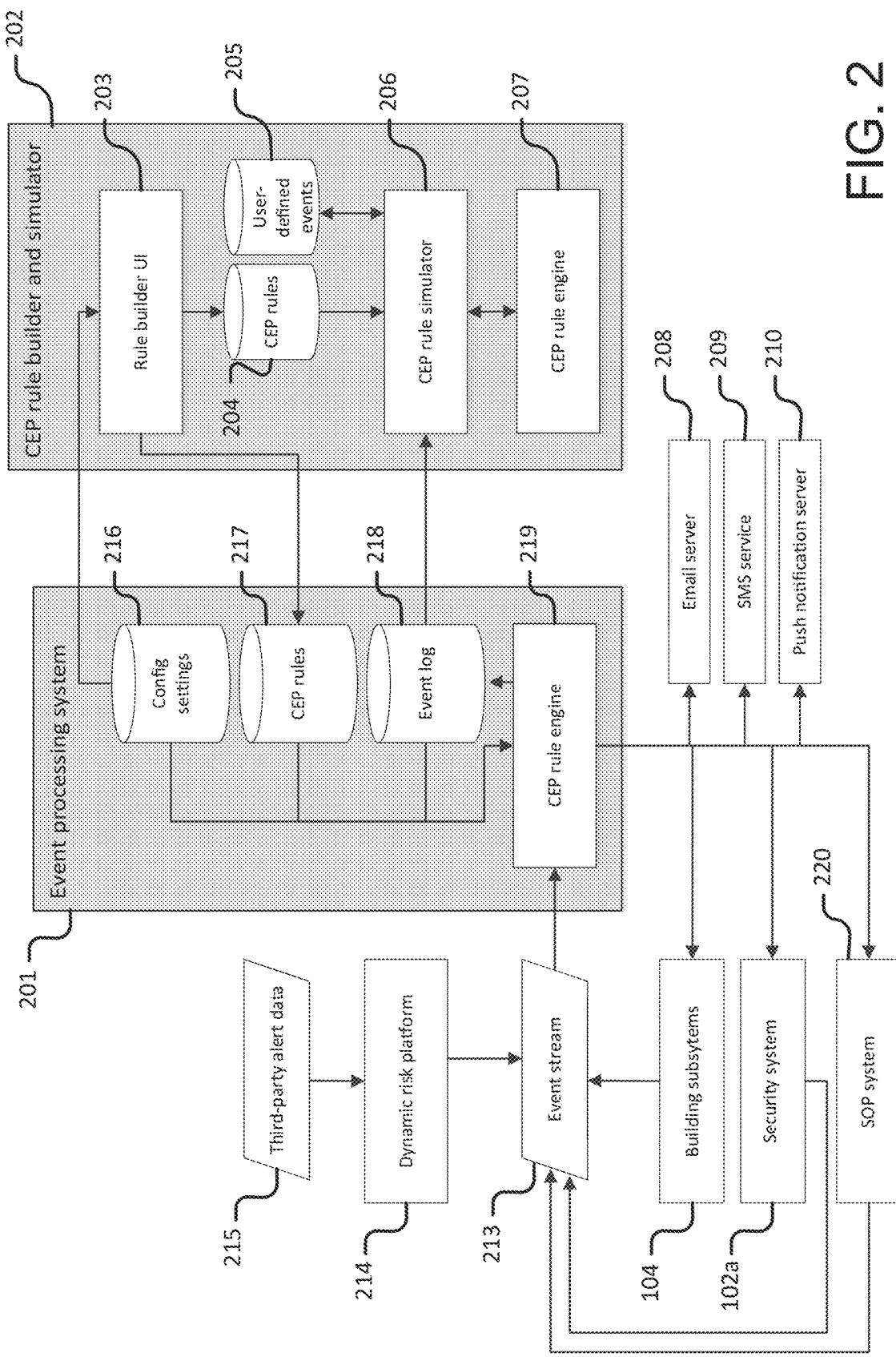
FIG. 2 is a block diagram of an event processing system, CEP rule builder and simulator, and connected systems, according to some embodiments.

Turning now to FIG. 2, the relationships between an event processing system, a complex event processing (CEP) rule builder and simulator system, and other associated systems is shown, according to some embodiments.

In some embodiments, the event processing system 201 includes a CEP rule engine 219, a data store for CEP rules 217 to be executed by the CEP rule engine 219, an event log 218 to record events previously processed by the CEP rule engine 219, and configuration settings 216, such as contact details and encodings for event types. CEP rule engine 219 ingests event stream 213, applies CEP rules 217 to determine which actions to take, and records processed events in event log 219.

The event stream 213 may include a combination of events from sources such as a building's security system 102a or a building's subsystems 104. In some embodiments, building subsystems 104 may include subsystems, such as fire detection and suppression, access control system, heating, ventilation, and cooling (HVAC), lighting, window blinds, and power monitoring (not shown). In some embodiments, event stream 213 may include events supplied by dynamic risk platform 214, which may have generated events after processing third-party alert data 215, such as information about burglaries in the vicinity of the building. Certain implementations of dynamic risk platforms and the functionality thereof are further described in U.S. Provisional Patent Application No. 62/960,605, filed on Jan. 13, 2020, the entire disclosure of which is incorporated by reference herein.

Actions taken by CEP rule engine 219 are determined by CEP rules 217 and include, but are not limited to, contacting designated persons by sending emails through use of an email server 208, sending SMS text messages to a mobile phone through use of an SMS service 209, and sending push notifications to a smart device through use of a push notification server 210. Contacted persons may include building managers, security operatives, and law enforcement agencies. Actions taken by CEP rule engine 219 may also include commanding an automated response in building subsystems 104 and security system 102a, such as sounding alarms, unlocking doors, and communicating alarms to a cloud server 116 of FIG. 1.

In some embodiments, actions taken by CEP rule engine 219 may trigger the activation of a standard operating procedure (SOP) in SOP system 220. The SOP may include a sequence of tasks, each of which is assigned to a specific individual or job role. For example, an event relating to a door that has been forced open may be processed by CEP rule engine 219, and an evaluated CEP rule may have an action to start an SOP in which a security guard must investigate the location where the event was generated. In some embodiments, the SOP system may generate events that are added to event stream 213. Following on from the previous example, a security guard may investigate a door forced open event, and record in SOP system 220 that law enforcement should be notified. Although actual notification of law enforcement may be undertaken by SOP system 220, an event may also be generated by SOP system 220 that is added to event stream 213, and a CEP rule processed by CEP rule engine 219 may indicate an action to also send an SMS to the building manager, activate the building's alarm system, command an access control system to restrict building access, or perform some other response. In some embodiments, actions taken by CEP rule engine 219 may modify or close an SOP in SOP system 220. For example, information about additional door forced open events may be added to a currently active SOP, or the pattern of subsequent door forced open events may be processed and indicate that they are the result of a faulty sensor, and an action generated to close the previously activated SOP.

CEP rules may be created to pass-through specific types of events and/or events generated by specific devices. For example, a rule may be created so that an event generated by a panic alarm installed at a reception desk always raises a silent alarm with a building's security, without any further analysis.

CEP rules may be created to suppress unwanted events. For example, although organizations may have security policies that prohibit tailgating at access controlled doors, in reality, office workers may still hold a door open for a familiar colleague. A door may also remain open for longer than expected to allow the passage of an individual with mobility issues or carts transporting deliveries. In all of these examples, a security system may generate events to indicate that a door has been held open that are not genuine causes for concern, and can be suppressed by carefully considered CEP rules.

CEP rules may be created to detect anomalous patterns. These may be created to complement the previously described suppression of unwanted events. For example, individual access denied events may be interpreted as individual people mistakenly trying to access individual doors, and the events suppressed. However, a pattern of multiple access denied events associated with a single access card, may indicate that an individual person has found or stolen an access card and is exploring which doors it provides access to. In this case an alarm should be raised.

CEP rules may be created to detect system faults. For example, a faulty sensor, such as a magnetic contact sensor on a window with a corroded electrical contact, may generate a large number of events within a short period of time.

As an alternative to the complicated and error-prone methods for authoring CEP rules that currently exist, the CEP rules may instead be authored in CEP rule builder and simulator 202. In some embodiments, CEP rule builder and simulator 202 is embedded into the same application as event processing system 201, which enables CEP rules to be provisioned directly in the application.

In some embodiments, CEP rule builder and simulator 202 is deployed separately from the application in which event processing system 201 resides. This enables CEP rules to be developed independently of any specific application or installation of an application. For example, CEP rules may be authored once, and then distributed to multiple applications. In this embodiment, CEP rules may be downloaded, and then uploaded to the application at a later time. CEP rule builder and simulator 202 may also include a feature to securely connect to an external application, and then directly transfer CEP rules to that application through use of an API, FTP, or other mechanism.

CEP rule builder and simulator 202 includes CEP rule builder UI 203, in which a user can create CEP rules through the arrangement of visual elements. Once created, CEP rules may be stored locally in data store 204 or transferred to data store 217 that resides in event processing system 201. In some embodiments, CEP rule builder UI 203 communicates with event processing system 201 to retrieve stored configuration settings 201 to define parameters in the CEP rule creation.

In some embodiments, CEP rule builder and simulator 202 includes a CEP rule simulator 206, which evaluates CEP rules 204 against event data. The event data may be user-defined events 205, the event log 218 in an event processing system 201, an event log in some other type of application, a live event stream 213, or some other source of event data. When evaluating CEP rules, the CEP rule simulator 206 may use local CEP rule engine 207. In some embodiments, the CEP rule simulator 206 may communicate with an event processing system 201 to access configuration settings 216 that may affect the execution of rules.

In some embodiments, CEP rule simulator 206 may communicate with event processing system 201 to utilize CEP rule engine 219. This ensures that the simulated results are an accurate representation of how rules will be evaluated by the event processing system 201. CEP rule simulator 206 may communicate CEP rules 204 to remote CEP rule engine 219 to be evaluated against event log 218. CEP rule simulator 206 may then receive an encoded representation of the actions that, under normal operation, would be sent to, for example, the building subsystems 104, security system 102a, email server 208, SMS service 209, or push notification server 210. The encoded representation of actions may be accompanied by metadata that describes the evaluation of the rules. In some embodiments, the CEP rule simulator 206 may communicate both CEP rules 204 and user-defined events 205 to the remote CEP rule engine 219 for evaluation.

Figure 3A:
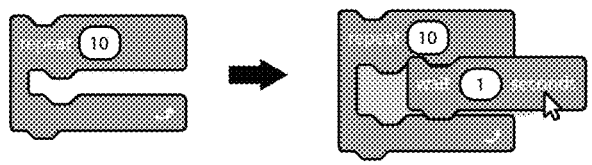
FIGS. 3a and 3b show examples of some of the features available in the Google Blockly library.
Figure 3B:
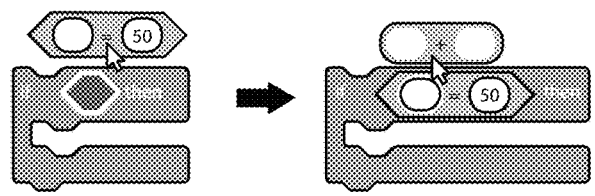

In some embodiments, the CEP rule builder UI 203 may utilize features of the Google Blockly library, which uses interlocking, graphical blocks, and is most commonly used as a visual programming language. FIG. 3a and FIG. 3b show examples of some of the features available in the library. The interface enforces validation rules, and it is not possible to position a block in a location that violates a validation rule. FIG. 3a shows snap-in guides that provide hints as to where the blocks can be slotted. FIG. 3b shows how the color and shape of blocks provide visual cues about how they can be arranged. Blockly is extensible, allowing the creation of additional blocks with custom functionality.

Figure 4:
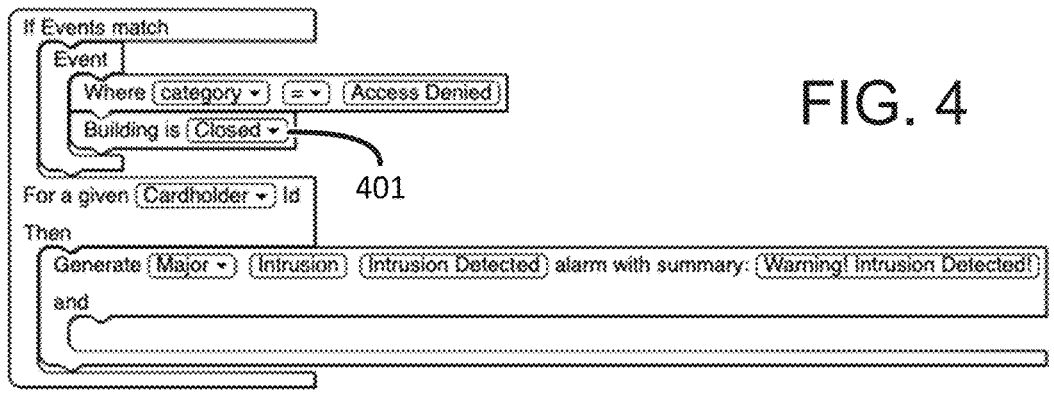
FIG. 4 shows an example CEP rule created using the visual rule builder, according to some embodiments.
Figure 5:
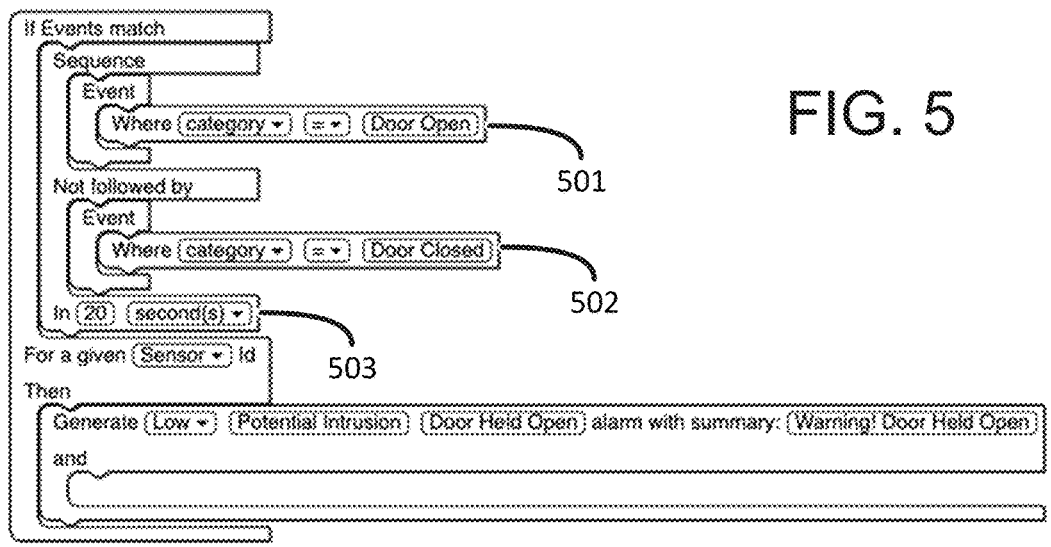
FIG. 5 shows an example CEP rule created using the visual rule builder, according to some embodiments.

FIG. 4 shows an example CEP rule created using extensions to the Google Blockly library, in which a person accessing a building outside of office hours generates an intrusion alarm. FIG. 5 shows an example CEP rule created using extensions to the Google Blockly library, in which a door being opened and not subsequently closed within 20 seconds generates a Door Held Open alarm.

The features described herein that support the creation and simulation of CEP rules are applicable to other visual programming languages and diagramming tools. The Google Blockly library could be replaced with a similar library, such as one that uses nodes to define functionality and connections between nodes to define relationships.

Figure 6:
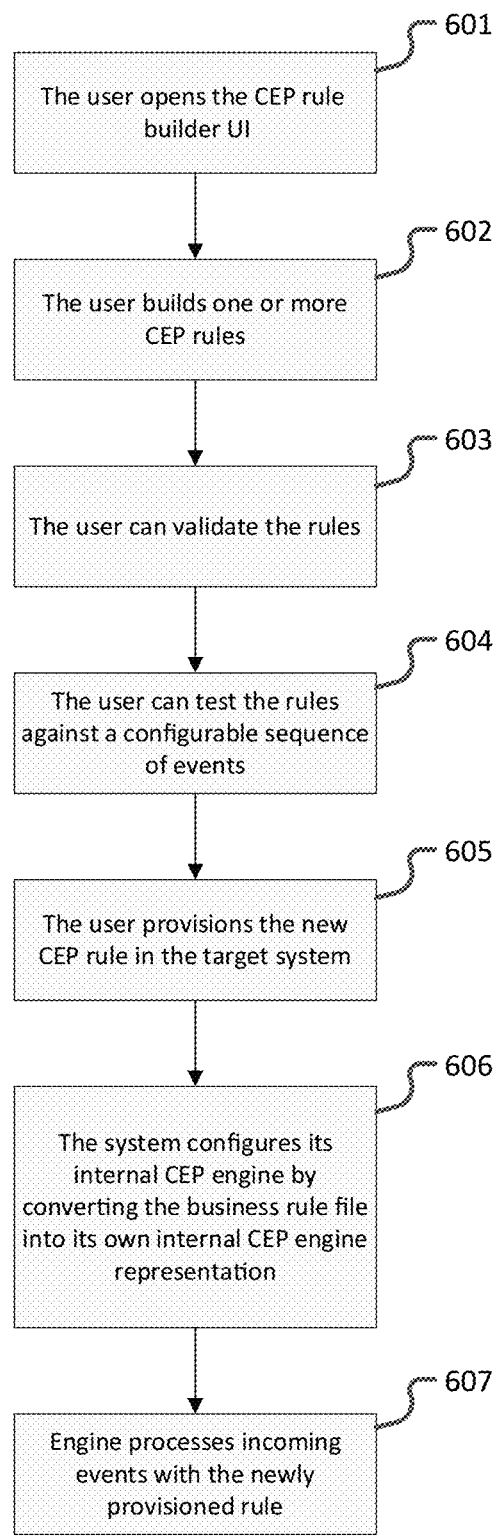
FIG. 6 shows a process diagram for creating and provisioning CEP rules, according to some embodiments.

FIG. 6 shows a process for creating and provisioning CEP rules, according to some embodiments. The user creates 602, validates 603, and runs simulations 604 on CEP rules in the rule builder and simulator 202 of FIG. 2. The user provisions the new CEP rule in the target system 605, such as the event processing system 201 of FIG. 2. The user may either download a business rule file that can be provisioned into the target system at a later time, or establish a connection to the target system and transfer the business rule file directly. This file representation of the rule may be an XML, Json, or Yaml file, but could also be a binary representation. The target system configures its internal CEP engine by converting the business rule file into its own internal CEP engine representation 606. Depending on the internal CEP Engine used by the system, this may mean converting the business rule file into SQL-like code (for example, for Esper), or some internal CEP engine structure in the language used by the CEP engine (for example, as Java objects for Flink-CEP). Once the engine has been provisioned, events flowing through the system will be tested against each provisioned CEP rule 607, and appropriate actions will be taken. In some embodiments, CEP rule builder and simulator 202 converts the business rule file into the format required by the CEP rule engine 207 or 219, for the purpose of simulation, communicating the rule to an event processing system 201 for immediate evaluation, for storage in a CEP rule database 204, or for some other purpose.

Figure 7:
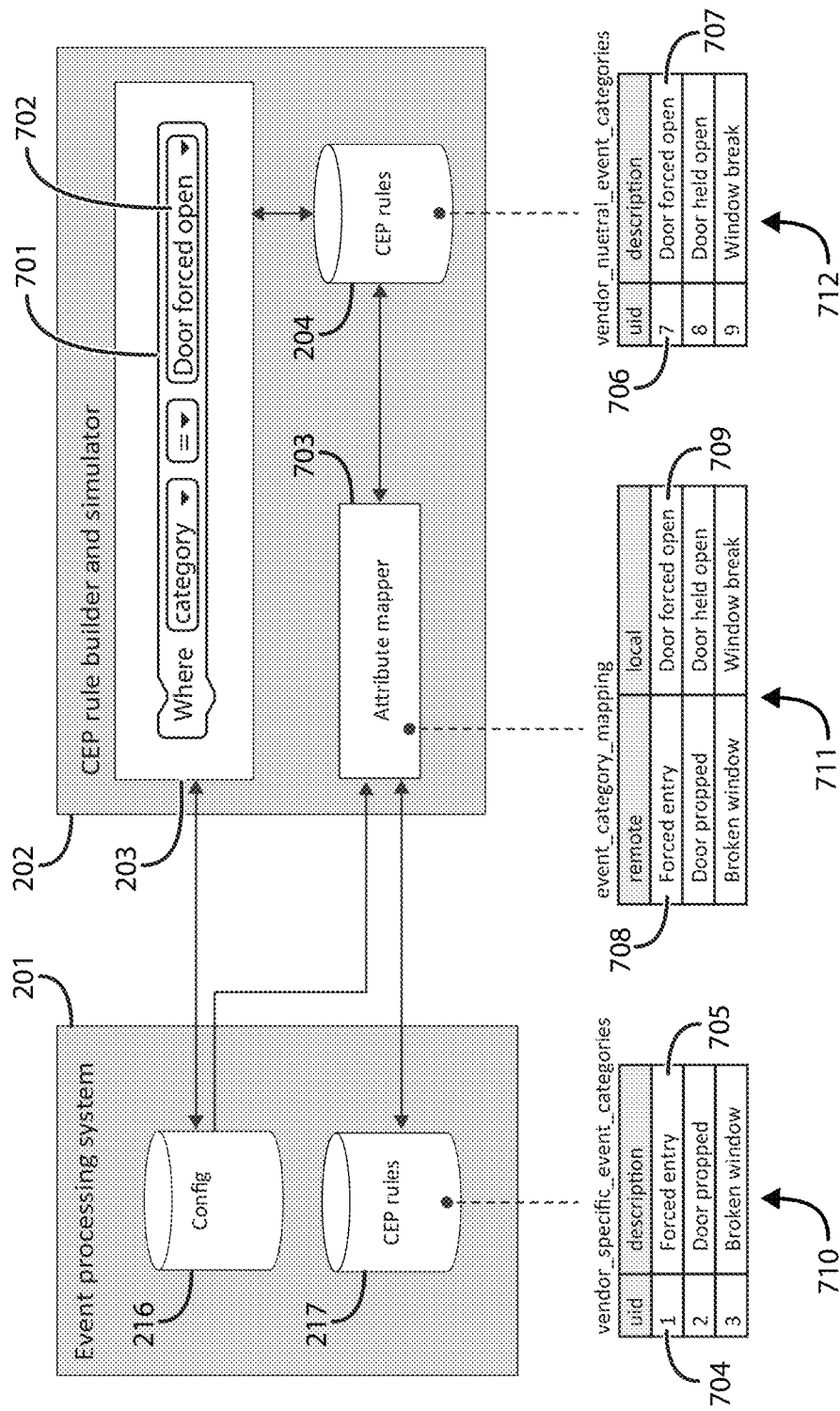
FIG. 7 shows a block diagram for mapping CEP rule attributes to those used in an external system, according to some embodiments.

FIG. 7 shows a block diagram for the process of mapping CEP rule attributes to those used in an external system, according to some embodiments. Event processing system 201 with data stores for configuration settings 216 and CEP rules 217, and CEP rule builder and simulator 202 with rule builder UI 203 and data store for CEP rules 209 are equivalent to the same numbered items of FIG. 2. CEP rule component 701 may include one or more user-configurable attributes, such as 702. For some user-configurable attributes, a user may select a value from a list of possible values. In some embodiments the list of possible values is retrieved through communication with a remote system, such as the configuration data store 216 of event processing system 201 or connection to a remote CEP rules database (not shown).

CEP rules may be generated for use by an external system, such as event processing system 201, which does not use the same descriptions for user-configurable attributes. For example, the description of event categories 712 in the local CEP rules data store 209 may not match the description of event categories 710 in the remote CEP rules data store 217. In some embodiments, where a standardized encoding is used across multiple systems, the internal unique ids 704 and 706 may be consistent (not shown) and only the textual descriptions 705 and 707 are different. In this embodiment, CEP rules may be encoded using the unique ids to ensure consistent execution between systems. In some embodiments, where unique ids 704 and 706 are not equivalent, an attribute mapper 703 may be used to define equivalent values for user-configurable attributes. For example, when a CEP rule from a local CEP database 209 is converted for use in a remote CEP rule database 217, the attribute mapper 703 may consult a mapping table 711 to determine which local value 709 should be substituted for which remote value 708. Mapping table 711 may be retrieved from a data store, such as configuration settings 216, or may be created in a user interface (not shown). In some embodiments, multiple local values may be mapped to a single remote value. For example, "door forced open" and "door held open" may both be mapped to a value of "door event", depending on the configuration of the remote system. In some embodiments, attribute mapper 703 may perform unit conversions, for example, from miles to kilometers. In some embodiments, CEP rule builder UI includes a validation feature, wherein it communicates with components in a remote system to determine if the defined attributes of a CEP rule are valid for execution in the remote system.

Figure 8:
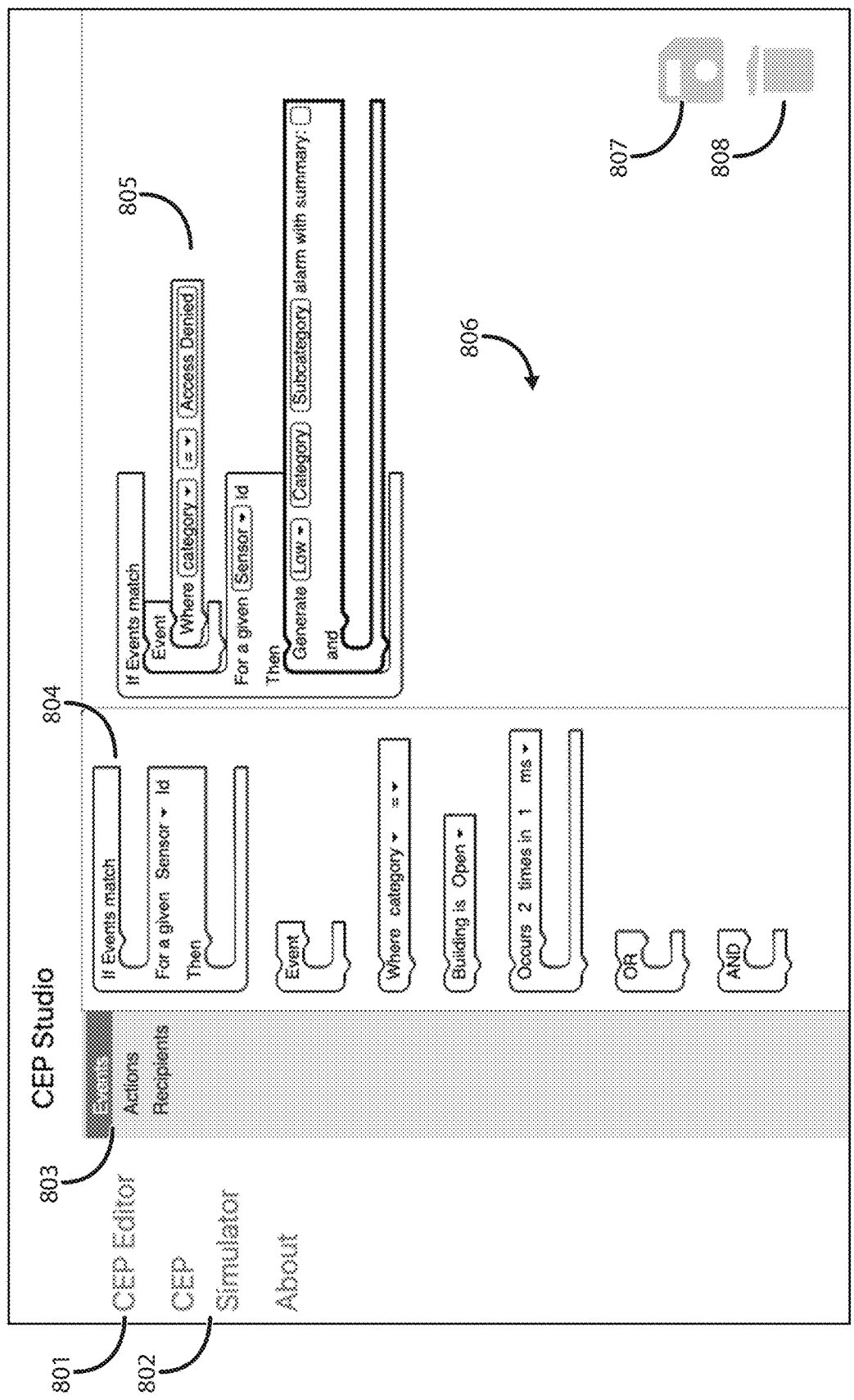
FIG. 8 shows a user interface for the CEP rule builder, according to some embodiments.

FIG. 8 shows an interface for the CEP rule builder UI 203 of FIG. 2. The user builds the rule 805 by snapping blocks 804 together on a canvas 806. Each type of block has a specific purpose. Categories 803 of block types may include event filtering, windowing (for example, repeat n times in m seconds), actions (for example, raise an alarm, send an email, or block specific events), and action-specific blocks (for example email recipient types or alarm options).

In some embodiments, canvas 806 can be any type of mechanism for allowing one or more blocks or other diagramming tools (e.g., block connectors, lines, arrows, etc.) to be connected or otherwise displayed, such as a window, a region, an area, or a dynamic image. In some embodiments, canvas 806 is a region where snapping blocks 804 are brought into the window based on user instructions.

Some blocks may enable a rule to take into account contextual information provided by an external system, such as event processing system 201 of FIG. 2. For example, to determine if a building is open or closed for business 401 of FIG. 4 when an event occurs, or whether a user's ID card has expired. Some blocks can also provide access to much more complex analytics, including machine learning and AI.

A recycling bin 808, or similar icon, may be provided in order to remove unwanted blocks from the canvas. Alternatively, menu items, keystrokes, or popup menus can be used to remove unwanted blocks.

In some embodiments, the system provides a validation process. When the user selects to validate the CEP rule, for example, by clicking on an icon or menu item, the configured CEP rule is validated against predefined criteria. For blocks that have multiple inputs or configuration points, each input or configuration point is validated. The UI may provide a visual indication of invalid blocks and items that need to be configured. Alternatively, the system may be in "auto-validate" mode, and provide validation in real time, as blocks are dropped onto the canvas and the CEP rule is built.

Icons or menu items can be provided in order to clear the canvas, upload a previously built CEP rule, download the CEP rule 807, or directly provision it into the target system.

Figure 9:
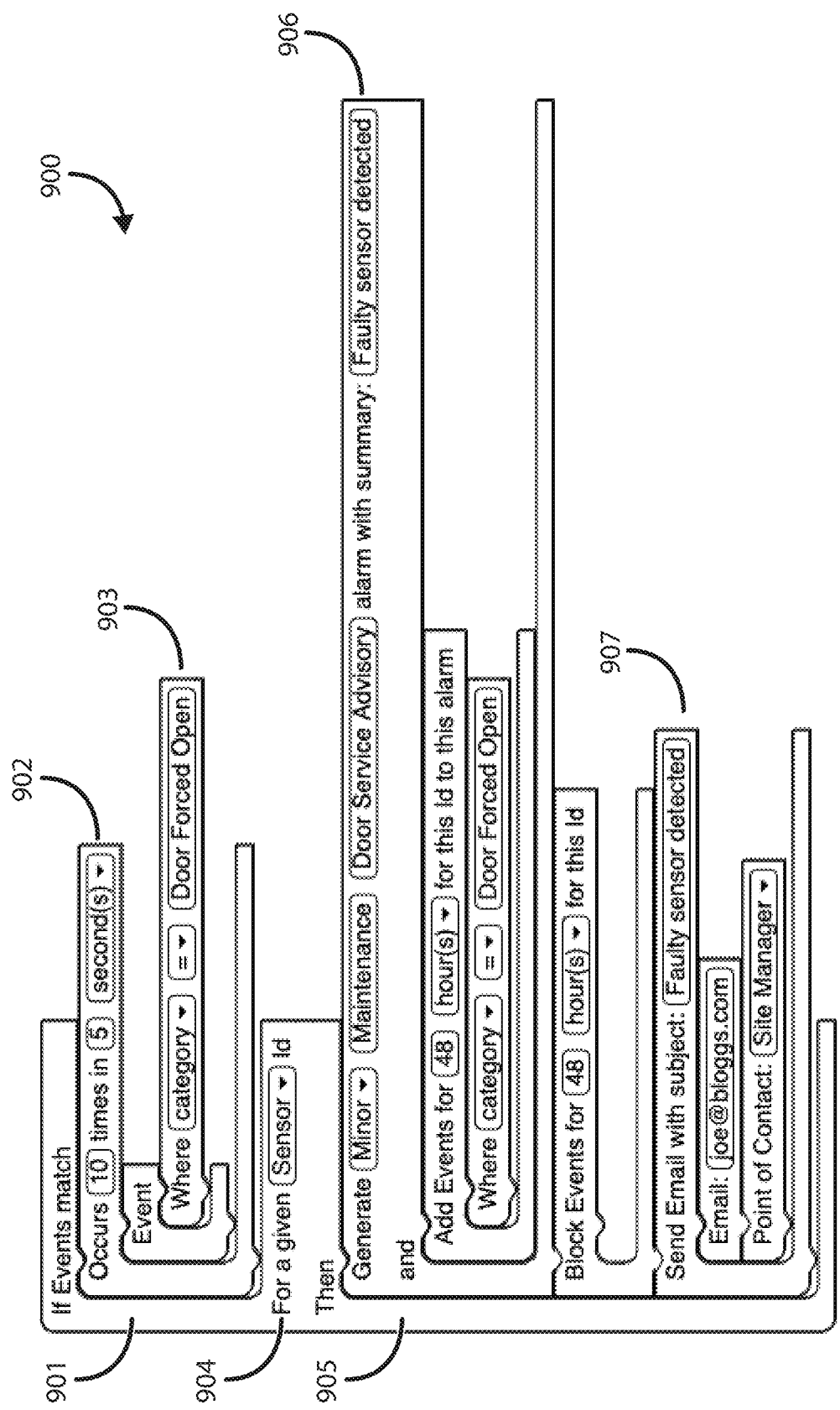
FIG. 9 shows an example CEP rule created using the visual rule builder, according to some embodiments.

FIG. 9 shows an example CEP rule, according to some embodiments. The purpose of CEP rule 900 is to detect and respond to a faulty sensor.

CEP rule 900 may include a detection pattern 901. Detection pattern 901 may include event filtering, such as restricting execution to events with a category of Door Forced Open 903. Event filtering can be performed on any attribute either directly or indirectly associated with an incoming event. Blocks can be nested to create more complex expressions, including the use of AND and OR logical relationships. Detection pattern 901 may include: windowing, such as "10 events in 5 seconds" 902; repetition, such as "2 Access Denied" events; or a sequence of events, such as shown in FIG. 5, where the sequence is Door Open 501 not followed by Door Closed 502 within 20 seconds 503.

CEP rule 900 may include a grouping mechanism that specifies how events are grouped 904. In a security monitoring system, this is typically on a per-access badge basis, but in some circumstances could be on a per-building basis, per-sensor basis, or based on any attribute either directly or indirectly associated with the incoming event. The rule builder UI, 203 of FIG. 2, presents a list of all available attributes, from which the user can select.

CEP rule 900 may include actions 905 to execute when the pattern is detected. Actions may include sending emails 907, SMSs, push notifications, raising alarms 906, or starting a Standard Operating Procedure (SOP). Actions may also integrate with the system that is executing the CEP rules, such as event processing system 201 of FIG. 2, to provide additional context. For example, a CEP rule may be configured to enrich the generated email with information about the building where the sensor that generated the alert is located. Generated outputs (e.g., emails and SMSs) may use templates that the user can configure, either as part of rule builder UI 203 of FIG. 2 or in an external tool.

Blocks can be defined to represent any functionality supported by the CEP rule engine 219 of FIG. 2, event processing system 201 of FIG. 2, or connected system. For example, if CEP rule engine 219 is in communication with a system that provides real-time tracking of assets, a block can be included in the UI to access this functionality. A user could then create a CEP rule to trigger different actions depending on whether a security guard is close to the location of an event.

CEP Rule Simulator

Figure 10:
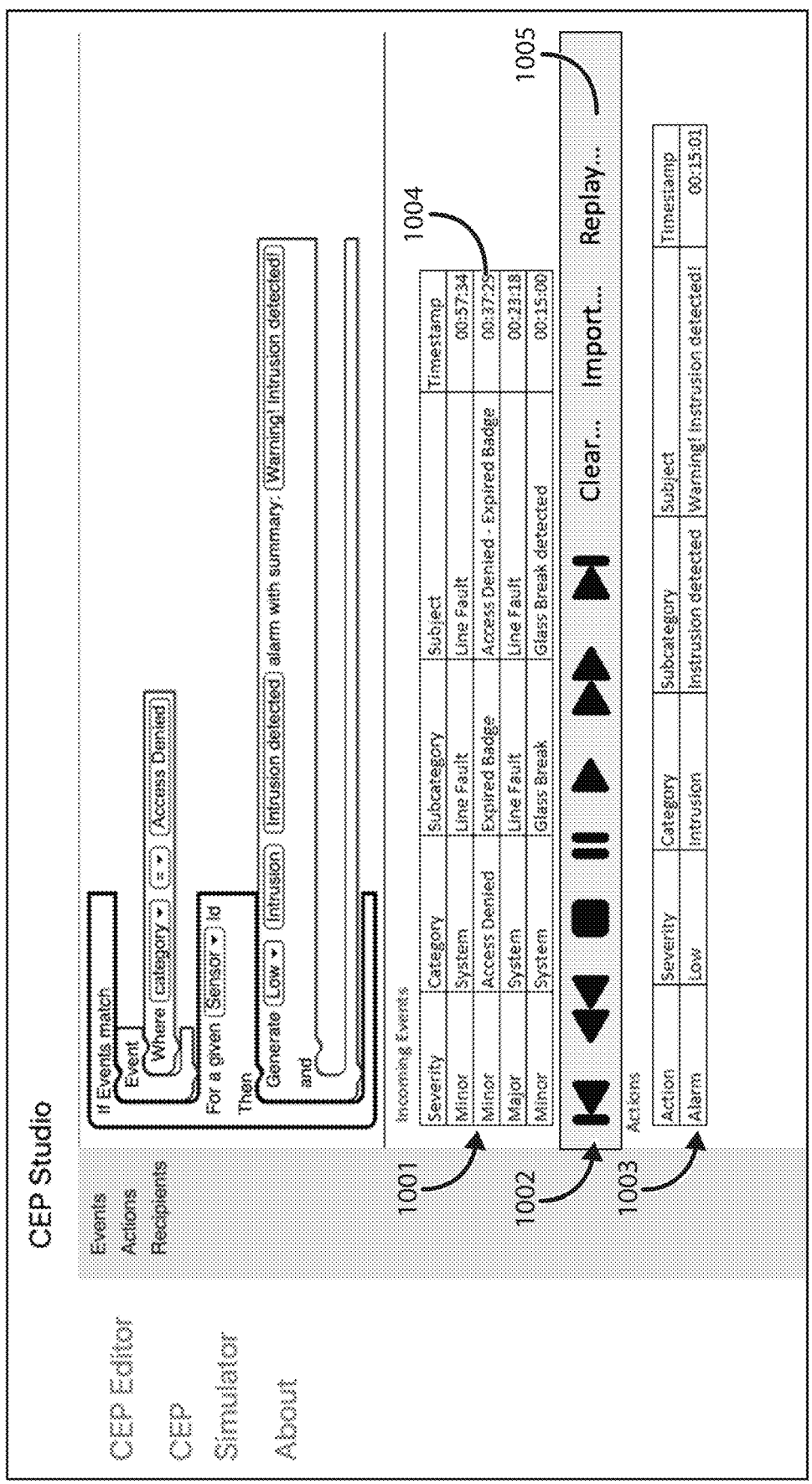
FIG. 10 shows a user interface for a CEP rule simulator system, according to some embodiments.

FIG. 10 shows an example interface for a simulation system, such as CEP rule simulator 206 of FIG. 2, according to some embodiments. A user simulates the processing of CEP rules against a set of events 1001. The UI may provide functionality to define a configurable sequence of simulated events. The UI may provide functionality to import a list of events stored in a file. The UI may provide functionality to replay a recorded sequence of real events from a previous time. For example, the user could select to replay the previous day's events from event log 218 of 2.

Options to import, replay, and clear events used in the simulation are provided in the UI 1005. Event times 1004 may be specified to test time-sensitive CEP rules. Standard playback control icons 1002 may be displayed in the user interface in order to start, pause, or stop the simulation process. The user may be provided with options to control the speed of the simulation. For example, setting 10 seconds of real time to be one hour of simulated time.

During the simulation process, the UI displays actions 1003 that are triggered as a result of rule execution, in some embodiments. When an action is triggered, the rule and events that led to the creation of that action may be highlighted in the UI. In some embodiments, either during or after completion of the simulation, a user can select an action to view the rule and events that triggered its creation. The identification of relevant rules and events could be through highlighting in the UI, opening a new window in the UI, or some other method.

Figure 11:
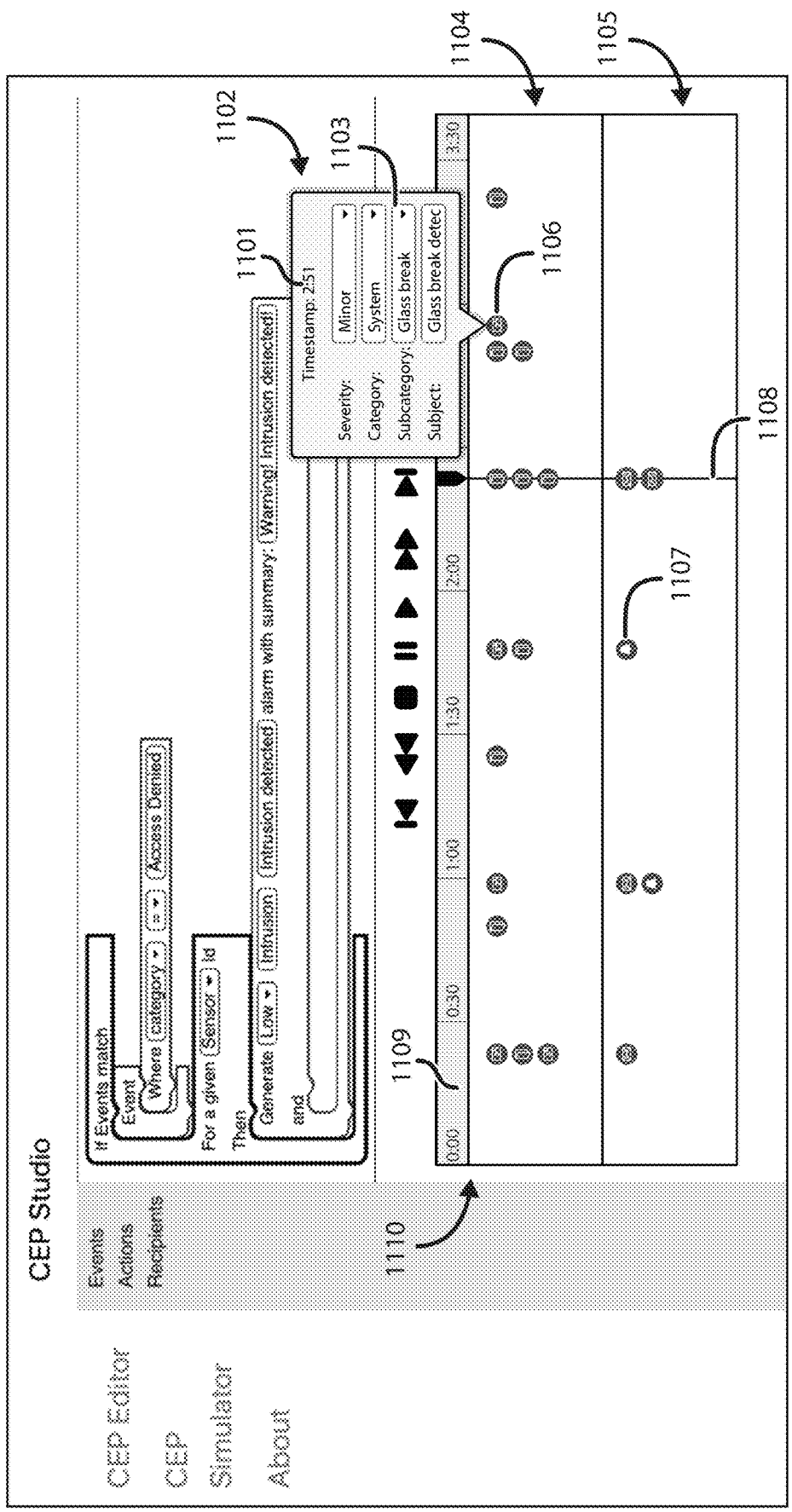
FIG. 11 shows a UI that presents timestamped event and action data on a timeline, according to some embodiments.

FIG. 11 shows a further example of a UI display of CEP rule simulator 206 of FIG. 2 that presents timestamped event and action data on a timeline, according to some embodiments. Timeline 1110 comprises a time bar 1109 with marked intervals of time, an event panel 1104, and an action panel 1105. Event panel 1104 may display icons, such as 1106, or a similar graphical representation for event information, wherein the horizontal location correlates with the timestamp of the event. Multiple events occurring at the same timestamp may be stacked vertically. Action panel 1105 may display icons, such as 1107, or similar graphical representation for actions arising from CEP rule execution, wherein the horizontal location correlates with the timestamp of the action. Selecting an event icon, such as 1106, may display information panel 1102, which includes timestamp 1101 and event metadata 1103. In some embodiments, event metadata 1103 is editable. In some embodiments, a user can click a location in event panel 1104 to create an event, wherein the timestamp of the event corresponds to the location that was clicked. Seek bar 1108 may travel along the timeline 1110, with events being processed by a CEP rule engine as the seek bar 1108 passes them, and icons generated for actions based on CEP rule activation. Selecting an action icon, such as 1107, may display an information panel (not shown) that displays information about the action.

Condensed CEP Rule Representation

Figure 12:
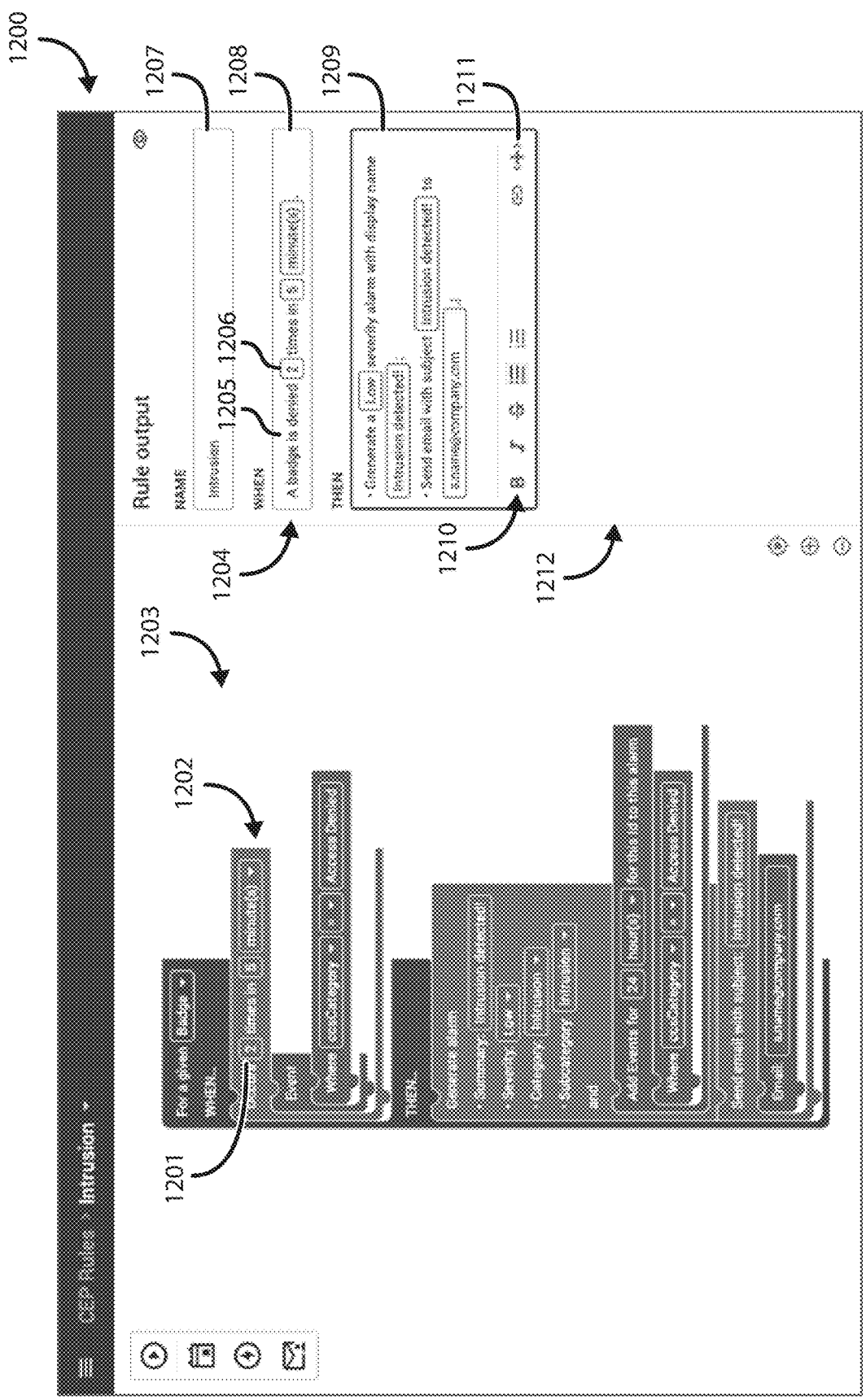
FIG. 12 shows a UI to create condensed, editable CEP rules, according to some embodiments.

Referring now to FIG. 12 a UI to create condensed, editable CEP rules is shown, according to some embodiments. The UI 1200 may be a user-selectable screen in rule builder UI 203 of FIG. 2. A first portion of the UI 1203 may be allocated to a visual programming language or diagramming tool that can be used to create a CEP rule, such as 1202 and as described in reference to FIG. 8. A second portion of the UI 1212 may be allocated to the creation of a condensed version 1204 of the original CEP rule 1202 created in the first portion of the UI 1203. The condensed version of the CEP rule 1204 may contain both explanatory text, for example 1205, and user-editable attributes, for example 1206. The person that creates the condensed version of the CEP rule 1204 can freely enter any explanatory text that may be required to explain the function and purpose of the CEP rule. The person that creates the condensed version of the CEP rule 1204 may also select any of the original CEP rule's 1202 attributes to include in the condensed version, and intermix them with explanatory text as required. As such, the condensed version of the CEP rule 1204 can be viewed as an abstraction of the original CEP rule 1202, with only selected attributes exposed for editing and the addition of descriptive text to aid comprehension.

The condensed version of the CEP rule 1204 may comprise multiple sections. For example: a name 1207 by which it is represented in other areas of the UI, a section 1208 that conveys to the end-user the conditions under which the rule is executed, and a section 1209 that conveys to the end-user the actions that are taken if the conditions in section 1208 are met. In some embodiments, the sections 1208, and 1209 may be rich text editors that support a variety of formatting options 1210, such as bulleted lists, different font-weights, and underlining.

Adding user-editable attributes to the sections 1208 and 1209 of the condensed version of the CEP rule 1204 may be achieved through several methods. In some embodiments, an attribute in the original CEP rule 1202, such as 1201, may be dragged to the desired location in the condensed version of the CEP rule 1204, such as 1206. In some embodiments, the cursor may be placed at the location in one of the sections 1208 or 1209 where the attribute is to be inserted. The user may then select an insert icon 1211 to change the UI to an attribute selection mode. Clicking an attribute in the original CEP rule 1202 adds that attribute at the cursor location in the condensed version of the CEP rule 1204, such as 1206. Additional parameters may be defined for a user-editable attribute, such as limiting it to a minimum and maximum numerical value.

An archive file format, such as Zip, tar, or JAR may be used to store both a converted version of a CEP rule that is ready to be imported into a CEP rule engine and an encoded representation of the condensed version of the CEP rule. Alternatively, both representations of the CEP rule may be communicated directly to the data store of an executing system, such as the CEP rules database 217 of FIG. 2. Once imported into the executing system, both representations of the CEP rule remain linked, such that changes made to one representation are also replicated in the other representation. If a user creates a copy of the rule, both representations are copied, and the newly copied versions are linked as a pair. In some embodiments, copied rules maintain a dynamic link to the rule from which they were copied, which serves as a parent rule. Some modifications to the parent rule, such as changes to the descriptive text in the condensed version of the rule, are automatically replicated in all descendants.

Figure 13:
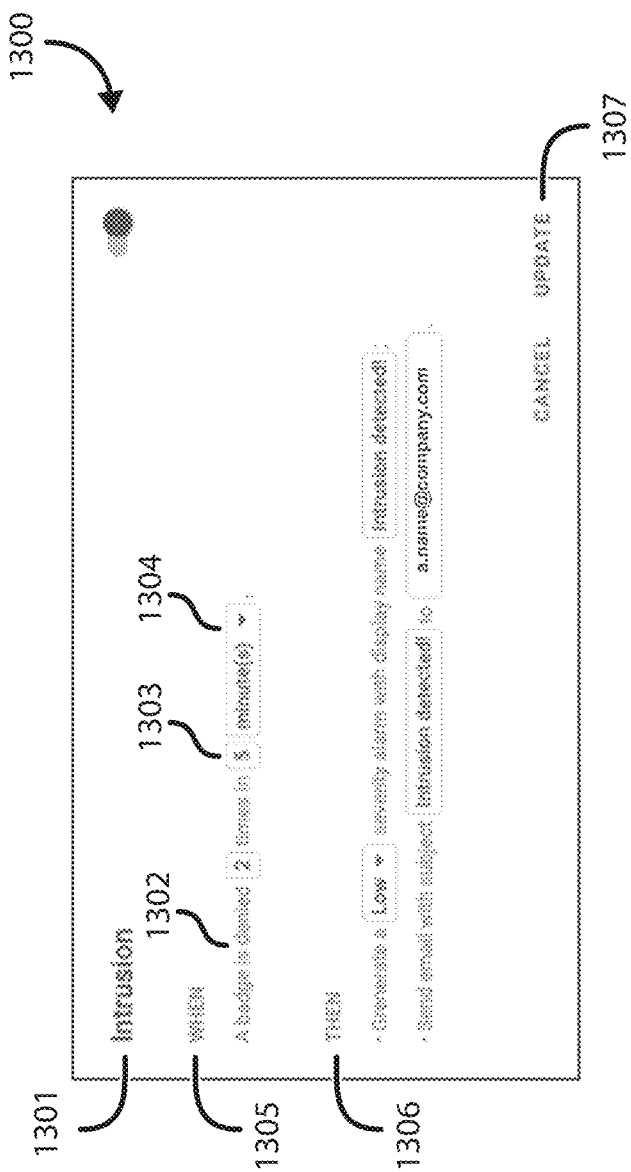
FIG. 13 shows a UI component through which a user can edit a condensed version of a CEP rule, according to some embodiments.

Referring now to FIG. 13, a UI component through which a user can edit a condensed version of a CEP rule is shown, according to some embodiments. The UI component 1300 may be accessible in a system that executes CEP rules, such as the event processing system 201 of FIG. 2 described above. The UI component 1300 may be part of a UI system that can be used to enable and disable CEP rules, as well as configure CEP rules within the limitations set by the designer of the condensed version of the rule. The UI component 1300 may display information 1301, 1305, and 1306 that was entered into 1207, 1208, 1209 of FIG. 12, respectively. In the UI component 1300, only the parts defined as user-configurable attributes, such as 1303 are editable. Descriptive text 1302 remains static and unchangeable. User-configurable attributes may be text entry fields 1303, lists of user-selectable values 1304, date pickers, link to an address book, or another type of UI component that is appropriate for the underlying attribute type. The user clicks a button 1307 to confirm changes, and the new values for the attributes are transferred to the underlying CEP rule. If the CEP rule is active, then the changes to the attributes may immediately affect evaluation of the rule by the CEP rule engine.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for implementing rules in a complex event processing (CEP) engine, the method comprising:
   displaying an interactive diagramming tool to a user on a user interface comprising a plurality of blocks, wherein a first block and a second block of the plurality of blocks represent portions of a rule and are shaped to indicate whether the first block and the second block can be fit together to create the rule;
   receiving, via the interactive diagramming tool, one or more commands to create the rule using the first block and the second block, wherein the first block represents an event, the second block comprises one or more criteria that are evaluated to determine whether the event has occurred, and the one or more commands to create the rule comprise fitting the first block and the second block together by placing the second block at least partially within the first block to define the event, wherein the first block and the second block are shaped to indicate that the one or more criteria of the second block can be used to define the event of the first block to create a valid rule;
   generating the rule for the CEP engine based on the one or more commands to create the rule;
   generating a first encoding of the rule using first attributes that described the one or more criteria, wherein the first encoding of the rule is compatible with the interactive diagramming tool; and
   processing the first encoding of the rule to generate a second encoding of the rule using second attributes that describe the one or more criteria, wherein the second encoding of the rule is compatible with the CEP engine to integrate the rule into the CEP engine.

2. The method of claim 1, wherein receiving the one or more commands to create the rule comprises receiving an indication that two or more blocks of the plurality of blocks have been connected in a region, the two or more blocks of the plurality of blocks representing at least one of an event filter, a constraint, or an action.

3. The method of claim 1, wherein receiving the one or more commands to create the rule comprises:
   defining one or more attributes of a CEP rule as exposed attributes;
   selecting locations for the exposed attributes within a block of text; and
   displaying the block of text in the user interface;
   wherein a value of the exposed attributes are displayed at the selected locations in the block of text.

4. The method of claim 1, wherein generating the rule for the CEP engine comprises:
   determining one or more attributes associated with the rule; and
   replacing, with the one or more attributes associated with the rule, one or more original attributes implemented in the CEP engine.

5. The method of claim 1, further comprising performing a validation process of the rule, wherein performing the validation process of the rule comprises:
   receiving a command to select one or more data sources for a plurality of events, wherein the plurality of events have associated time stamps; evaluating a simulation of the plurality of events against the rule in sequential order of the associated time stamps; and displaying an output based on the simulation to the user interface.

6. The method of claim 1, further comprising performing a validation process of the rule, wherein performing the validation process of the rule comprises:
   establishing a data connection with an external system over a computer network;
   transferring the first encoding of the rule to a first data store in the external system;
   processing the first encoding by the external system to determine the second encoding, wherein the second encoding is compatible with a processing system in the external system;
   transferring the second encoding to a second data store on the external system; and
   evaluating the second encoding by the processing system in the external system.

7. A controller in an event processing system, the controller comprising a processing circuit configured to:
   display an interactive diagramming tool to a user on a user interface comprising a plurality of blocks, wherein a first block and a second block of the plurality of blocks represent portions of a rule and are shaped to indicate whether the first block and the second block can fit together to create the rule;
   receive, via the interactive diagramming tool, one or more commands to create the rule using the first block and the second block, wherein the first block represents an event, the second block comprises one or more criteria that are evaluated to determine whether the event has occurred, and the one or more commands to create the rule comprise fitting the first block and the second block together by placing the second block at least partially within the first block to define the event, wherein the first block and the second block are shaped to indicate that the one or more criteria of the second block can be used to define the event of the first block to create a valid rule;
   generate the rule for a complex event processing (CEP) engine based on the one or more commands to create the rule;
   generate a first encoding of the rule using first attributes that described the one or more criteria, wherein the first encoding of the rule is compatible with the interactive diagramming tool; and
   process the first encoding of the rule to generate a second encoding of the rule using second attributes that describe the one or more criteria, wherein the second encoding of the rule is compatible with the CEP engine to integrate the rule into the CEP engine.

8. The controller of claim 7, wherein receiving the one or more commands to create the rule comprises receiving an indication that two or more blocks of the plurality of blocks have been connected in a region, the two or more blocks of the plurality of blocks representing at least one of an event filter, a constraint, or an action.

9. The controller of claim 7, wherein receiving the one or more commands to create the rule comprises:
   defining one or more attributes of a CEP rule as exposed attributes;
   selecting locations for the exposed attributes within a block of text; and
   displaying the block of text in the user interface; wherein a value of the exposed attributes are displayed at the selected locations in the block of text.

10. The controller of claim 7, wherein generating the rule for the CEP engine comprises:
   determining one or more attributes associated with the rule; and
   replacing, with the one or more attributes associated with the rule, one or more original attributes implemented in the CEP engine.

11. The controller of claim 7, wherein the processing circuit is configured to perform a validation process of the rule, wherein performing the validation process of the rule comprises:
   receiving a command to select one or more data sources for a plurality of events, wherein the plurality of events have associated time stamps;
   evaluating a simulation of the plurality of events against the rule in sequential order of the associated time stamps; and
   displaying an output based on the simulation to the user interface.

12. The controller of claim 7, wherein the processing circuit is configured to perform a validation process of the rule, wherein performing the validation process of the rule comprises:
   establishing a data connection with an external system over a computer network;
   transferring the first encoding of the rule to a first data store in the external system;
   processing the first encoding by the external system to determine a second encoding, wherein the second encoding is compatible with a processing system in the external system;
   transferring the second encoding to a second data store on the external system; and
   evaluating the second encoding by the processing system in the external system.

13. The controller of claim 7, wherein generating the rule comprises analyzing an attribute of a component that is bound to a parameter in the event processing system, such that a value or a range of values of the attribute from which the user can assign to the attribute is determined by the parameter in the event processing system.

14. The controller of claim 13, wherein:
   the value or the range of values of the attribute can be modified; and
   in response to modifying the value or the range of values, updating one or more corresponding attributes in the rule to match modification of the value or the range of values.

15. One or more non-transitory computer-readable media for implementing rules in a complex event processing (CEP) engine, the computer-readable media having instructions stored thereon that, when executed by one or more processors, causes the one or more processors to perform operations comprising:
   displaying an interactive diagramming tool to a user on a user interface comprising a plurality of blocks, wherein a first block and a second block of the plurality of blocks represent portions of a rule and are shaped to indicate whether the first block and the second block can be fit together to create the rule;
   receiving, via the interactive diagramming tool, one or more commands to create the rule using the first block and the second block, wherein the first block represents an event, the second block comprises one or more criteria that are evaluated to determine whether the event has occurred, and the one or more commands to create the rule comprise fitting the first block and the second block together by placing the second block at least partially within the first block to define the event, wherein the first block and the second block are shaped to indicate that the one or more criteria of the second block can be used to define the event of the first block to create a valid rule;

generating the rule for the CEP engine based on the one or more commands to create the rule;

generating a first encoding of the rule using first attributes that described the one or more criteria, wherein the first encoding of the rule is compatible with the interactive diagramming tool; and processing the first encoding of the rule to generate a second encoding of the rule using second attributes that describe the one or more criteria, wherein the second encoding of the rule is compatible with the CEP engine to integrate the rule into the CEP engine.

16. The one or more non-transitory computer-readable storage media of claim 15, wherein receiving the one or more commands to create the rule comprises receiving an indication that two or more blocks of the plurality of blocks have been connected in a region, the two or more blocks of the plurality of blocks representing at least one of an event filter, a constraint, or an action.

17. The one or more non-transitory computer-readable storage media of claim 15, wherein receiving the one or more commands to create the rule comprises:

defining one or more attributes of a CEP rule as exposed attributes;

selecting locations for the exposed attributes within a block of text; and displaying the block of text in the user interface; wherein a value of the exposed attributes are displayed at the selected locations in the block of text.

* * * * *